US012683846B2

(12) United States Patent　　(10) Patent No.:　US 12,683,846 B2
Xin et al.　　(45) Date of Patent:　　Jul. 14, 2026

(54) DATA MODULATION METHOD, COMMUNICATION DEVICE AND STORAGE MEDIUM

(71) Applicant: ZTE CORPORATION, Shenzhen (CN)

(72) Inventors: Yu Xin, Shenzhen (CN); Tong Bao, Shenzhen (CN); Jian Hua, Shenzhen (CN); Guanghui Yu, Shenzhen (CN); Liujun Hu, Shenzhen (CN); Jin Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 32 days.

(21) Appl. No.: 18/923,345

(22) Filed: Oct. 22, 2024

(65) Prior Publication Data

US 2025/0047541 A1　　Feb. 6, 2025

Related U.S. Application Data

(63) Continuation of application No. 18/014,936, filed as application No. PCT/CN2021/103941 on Jul. 1, 2021, now Pat. No. 12,155,518.

(30) Foreign Application Priority Data

Jul. 7, 2020　(CN) .......................... 202010647190.1

(51) Int. Cl.
*H04L 27/26*　　(2006.01)
*G06F 17/18*　　(2006.01)

(52) U.S. Cl.
CPC .......... *H04L 27/2627* (2013.01); *G06F 17/18* (2013.01)

(58) Field of Classification Search
CPC ............................ H04L 27/2627; G06F 17/18
See application file for complete search history.

(56) References Cited

U.S. PATENT DOCUMENTS

| | | | |
|---|---|---|---|
| 8,385,671 B1 * | 2/2013 | Batur | ........................ G06T 5/70 |
| | | | 382/254 |
| 10,164,813 B2 | 12/2018 | Hasegawa | |
| 10,812,300 B2 * | 10/2020 | Kuchi | ................. H04L 27/2644 |

(Continued)

OTHER PUBLICATIONS

PCT International Search Report and Written Opinion (w/ English translation) for corresponding PCT Application No. PCT/CN2021/103941, mailed on Sep. 28, 2021, 13 pages.

(Continued)

*Primary Examiner* — Freshteh N Aghdam
(74) *Attorney, Agent, or Firm* — Dority & Manning, P.A.

(57) ABSTRACT

A data modulation method, a communication device and a storage medium are disclosed. The data modulation method includes: performing a preset modulation operation on B consecutive data blocks, and configuring the B consecutive data blocks to have a same head-end reference signal sequence and/or a same tail-end reference signal sequence; inserting Z zeros between adjacent time domain data of the B consecutive data blocks; performing a filtering operation on the B consecutive data blocks into which Z zeros have been inserted, and transmitting the filtered data on a physical resource, where B is greater than or equal to 2 (i.e., B≥2), and Z is greater than or equal to 0 (i.e., Z≥0).

14 Claims, 5 Drawing Sheets

(56)                    References Cited

U.S. PATENT DOCUMENTS

| | | |
|---|---|---|
| 2008/0031376 A1 | 2/2008 | Ban |
| 2016/0182270 A1 | 6/2016 | Jungnickel et al. |
| 2016/0277936 A1* | 9/2016 | Hasegawa ............. H04W 16/14 |
| 2018/0091983 A1 | 3/2018 | Hasegawa |
| 2018/0248733 A1 | 8/2018 | Hasegawa |
| 2019/0052486 A1 | 2/2019 | Kuchi |
| 2020/0076558 A1* | 3/2020 | Kuchi ................... H04L 5/0051 |

OTHER PUBLICATIONS

Extended European Search Report for corresponding Application No. 21836958, dated Jun. 24, 2024, 7 pages.
Office Action received in corresponding U.S. Appl. No. 18/014,936 dated Mar. 28, 2024, 11 pages.
"Spectrum shaping for $\pi/2$-BPSK DFT-s-OFDM", 3GPP TSG RAN WG1 Meeting #89, Hangzhou, PR China, May 15-19, 2017, 5 pages.
"Draft Agenda", 3GPP TSG RAN WG1 #103-e, E-Meeting, Oct. 26-Nov. 13, 2020, 7 pages.

* cited by examiner

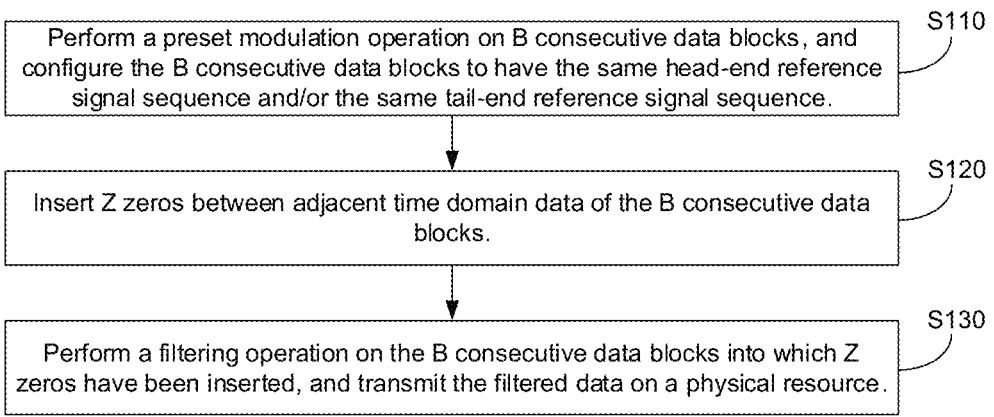

S110

Perform a preset modulation operation on B consecutive data blocks, and configure the B consecutive data blocks to have the same head-end reference signal sequence and/or the same tail-end reference signal sequence.

S120

Insert Z zeros between adjacent time domain data of the B consecutive data blocks.

S130

Perform a filtering operation on the B consecutive data blocks into which Z zeros have been inserted, and transmit the filtered data on a physical resource.

FIG. 1

Head-end
reference signal
sequence

Tail-end
reference signal
sequence

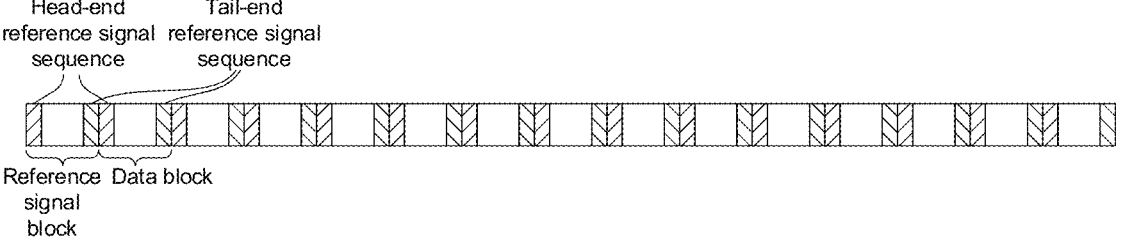

Reference
signal
block

Data block

FIG. 2

DATA MODULATION METHOD, COMMUNICATION DEVICE AND STORAGE MEDIUM

CROSS-REFERENCE TO RELATED APPLICATIONS

This application is a continuation of U.S. application Ser. No. 18/014,936, filed on Jan. 6, 2023, which is a National Stage of International Application PCT/CN2021/103941, filed Jul. 1, 2021. The International application claims priority to Chinese Patent Application No. 202010647190.1, filed Jul. 7, 2020. The aforementioned patent applications are hereby incorporated by reference in their entireties.

TECHNICAL FIELD

The present disclosure relates to the field of communication technologies, for example, to a data modulation method, a communication device and a storage medium.

BACKGROUND

In high frequency scenarios, some regions at an edge of a cell have a very low signal-to-noise ratio due to large path losses and shadow fading. Moreover, a power amplifier (PA) has a low efficiency when it operates at high frequency. In order to improve the signal-to-noise ratio and save the power consumption of a battery in user equipment (UE), it is required that a peak-to-average power ratio (PAPR) of a signal sent by the UE is low. In a massive machine type of communication (mMTC) scenario, some terminal devices need to reduce battery power consumption. Therefore, in order to improve the efficiency of PA in the terminal device, it is also required that the PAPR of the signal sent by the UE is low.

SUMMARY

Embodiments of the present disclosure provide a data modulation method, and the method includes:

performing a preset modulation operation on B consecutive data blocks, and configuring the B consecutive data blocks to have a same head-end reference signal sequence and/or a same tail-end reference signal sequence;

inserting Z zeros between adjacent time domain data of the B consecutive data blocks; and performing a filtering operation on the B consecutive data blocks into which Z zeros have been inserted, and transmitting the filtered data on a physical resource, where B is greater than or equal to 2 (i.e., B≥2), and Z is greater than or equal to 0 (i.e., Z≥0).

The embodiments of the present disclosure further provide a communication device. The communication device includes a memory, a processor, a program stored in the memory and executable in the processor, and a data bus for achieving connection and communication between the processor and the memory. The program implements the data modulation method provided by the embodiments when executed by the processor.

The embodiments of the present disclosure further provide a storage medium for computer-readable storage. The storage medium has stored therein one or more programs that are executable by one or more processors to implement the data modulation method provided by the embodiments.

BRIEF DESCRIPTION OF THE DRAWINGS

FIG. 1 is a flowchart of a data modulation method, in accordance with the embodiments of the present disclosure;

FIG. 2 is a schematic diagram showing a structure of a reference signal block and a data block within a time slot, in accordance with the embodiments of the present disclosure;

DETAILED DESCRIPTION

Figure 3:
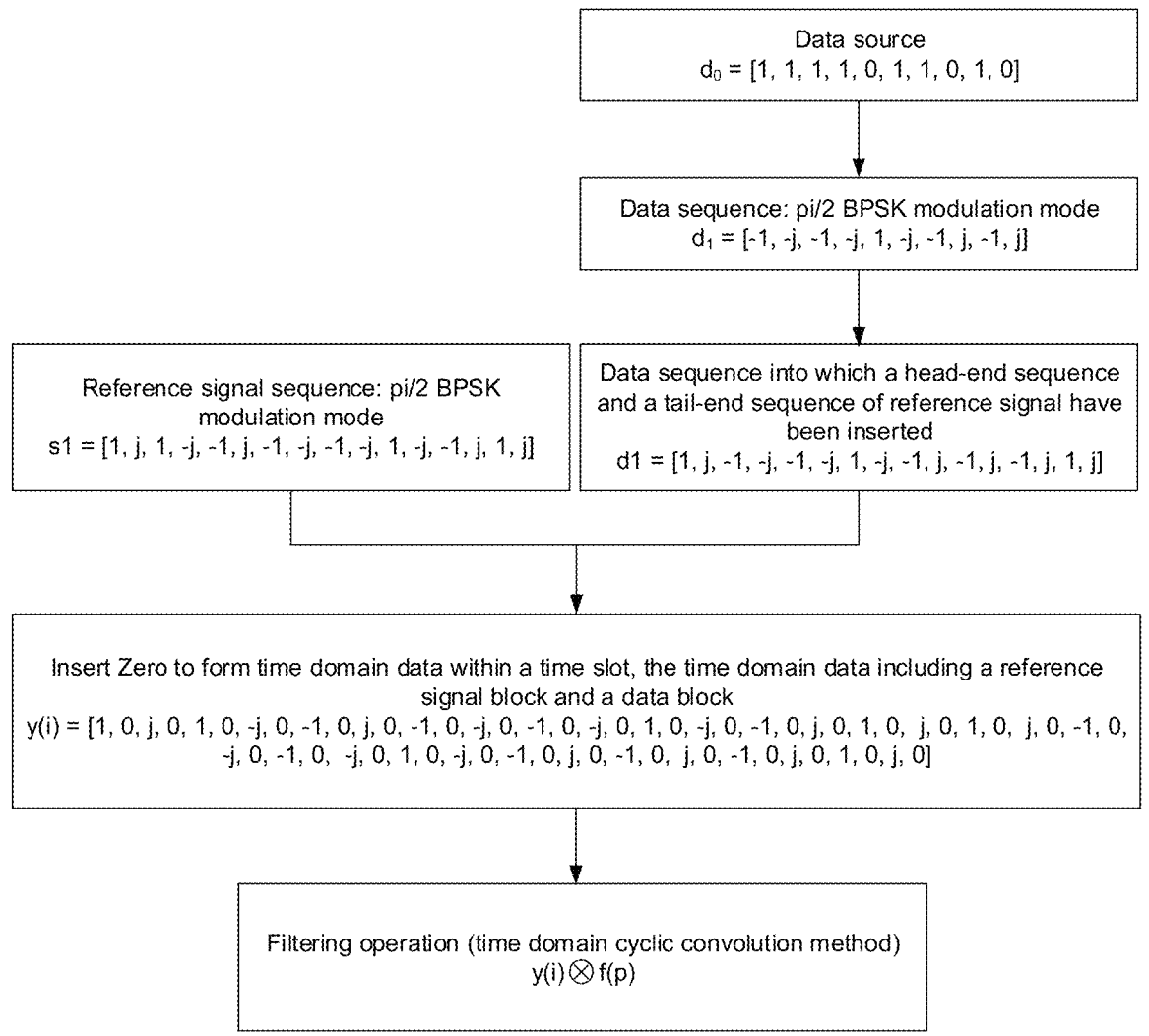
FIG. 3 is a flowchart of a data modulation method, in accordance with the embodiments of the present disclosure.

Embodiments of the present disclosure will be described in detail with reference to the accompanying drawings below. It will be noted that, the embodiments in the present disclosure and features in the embodiments may be arbitrarily combined with each other in a case where they don't conflict.

It will be understood that specific embodiments described herein are intended to be explanatory only and not to limit the present disclosure.

In the following description, suffixes such as "module", "component" or "unit" used to denote elements are only for the purpose of facilitating the description of the present disclosure, and these words have no particular meaning by themselves. Thus, "module", "component" or "unit" may be used interchangeably.

In both high frequency scenarios and mMTC scenarios, a peak-to-average power ratio (PAPR) of a signal sent by user equipment (UE) is required to be low. For the mMTC scenarios, especially when a large number of users are non-orthogonal accessed, a signal-to-interference-plus-noise ratio (SINR) is very low, and thus there is a need to design a low PAPR signal modulation scheme or waveform scheme.

In the standard of the new radio (NR) access technology of the 5th generation (5G) mobile communication, although a discrete Fourier transform-spread orthogonal frequency division multiplexing (DFT-s-OFDM) signal has a low PAPR, it is still unable to meet application scenarios with lower PAPR requirements of the beyond 5th generation (B5G) or the 6th generation (6G) mobile communication. Therefore, it is necessary to design a scheme for further reducing the PAPR. In addition, reducing out-of-band leakage is also a requirement of B5G and 6G. Low out-of-band leakage may not only reduce the interference between frequency bands, but also reduce the waste of out-of-band power, which is equivalent to further improving the efficiency of a PA. The existing PAPR of communication signals is still high, which can hardly meet the demand for a lower PAPR in some communication scenarios.

As shown in FIG. 1, the embodiments of the present disclosure provide a data modulation method, and the method includes steps 110 to 130 (S110 to S130).

In S110, a preset modulation operation is performed on B consecutive data blocks, and the B consecutive data blocks are configured to have the same head-end reference signal sequence and/or the same tail-end reference signal sequence.

In S120, Z zeros are inserted between adjacent time domain data of the B consecutive data blocks.

In S130, a filtering operation is performed on the B consecutive data blocks into which Z zeros have been inserted, and the filtered data are transmitted on a physical resource, where B is greater than or equal to 2 (i.e., B≥2), and Z is greater than or equal to 0 (i.e., Z≥0).

The B consecutive data blocks may be data blocks within the same time slot, or data blocks within a plurality of consecutive time slots. A modulation result of the preset modulation operation on the B consecutive data blocks is such that all data blocks in the B consecutive data blocks have the same head-end reference signal sequence, or have the same tail-end reference signal sequence, or have the same head-end reference signal sequence and the same tail-end reference signal sequence. Then between adjacent time domain data of the B consecutive data blocks, at least one zero is inserted or no zero is inserted. After the filtering operation is performed on the B consecutive data blocks, the PAPR may be reduced; in addition, time domain data has continuity to a certain extent, and there is no discontinuity in data between adjacent data blocks. The filtered data may be transmitted on the physical resource. Other filtering operations may also be performed on the data when they are transmitted on the physical resource.

In an implementation, the step of performing the preset modulation operation on the B consecutive data blocks includes: modulating bit data to be transmitted by using a preset modulation mode, the modulated data being transmitted in the B consecutive data blocks.

In an implementation, the step of performing the preset modulation operation on the B consecutive data blocks, and configuring the B consecutive data blocks to have the same head-end reference signal sequence and/or the same tail-end reference signal sequence includes:

a reference signal sequence in a reference signal block within K consecutive time slots and a reference signal sequence and a data sequence in a data block within K consecutive time slots being time domain data sequences modulated by using a preset modulation mode, where K is greater than or equal to 1 (i.e., K≥1), and the B consecutive data blocks are within the K consecutive time slots; and configuring all reference signal blocks and data blocks within the K consecutive time slots to have the same head-end reference signal sequence and/or the same tail-end reference signal sequence.

A time slot may include N reference signal blocks and M data blocks, where N is greater than or equal to 0 (i.e., N≥0), and M is greater than or equal to 1 (i.e., M≥1). The B consecutive data blocks may be within the K consecutive time slots. For example, within two consecutive time slots, there is one reference signal block and one data block within the former time slot, and there is no reference signal block and one data block within the latter time slot, so that the data block within the former time slot and the data block within the latter time slot are consecutive. The B consecutive data blocks may also be within the same time slot. Optionally, the step of inserting Z zeros between adjacent time domain data of the B consecutive data blocks includes: inserting Z zeros between adjacent time domain data within the K consecutive time slots.

The step of modulating all reference signal blocks and data blocks within a time slot by using the preset modulation mode further includes modulating the reference signal blocks and the data blocks by using the same modulation mode, and the modulation result is such that all reference signal blocks and data blocks within a time slot have the same head-end reference signal sequence and the same tail-end reference signal sequence. For example, the reference signal blocks and the data blocks may be modulated by using the same modulation mode, and the head-end reference signal sequences and/or the tail-end reference signal sequences of the modulated reference sequences are inserted into corresponding positions of the modulated data sequences, so that all reference signal blocks and data blocks within a time slot have the same head-end reference signal sequence and the same tail-end reference signal sequence.

In an implementation, the reference signal block and the data block are orthogonal frequency division multiplexing (OFDM) symbols.

In an implementation, the adjacent time domain data include a reference signal sequence and a data sequence. With regard to the operation of inserting Z zeros between adjacent time domain data of the B consecutive data blocks, the operation of inserting zero is performed on both the reference signal sequence and the data sequence in the data block.

In an implementation, the preset modulation mode includes a pi/2 binary phase shift keying (BPSK) modulation mode, a quadrature phase shift keying (QPSK) modulation mode or other modulation modes. The preset modulation mode may include a plurality of preset modulation modes.

The pi/2 BPSK modulation mode or the QPSK modulation mode is used for both the reference sequence in the reference signal block and the reference sequence and data sequence in the data block. Through the filtering operation after inserting zero, the PAPR within a whole time slot is very low, and each block within the time slot has the same PAPR.

In an implementation, the step of performing the filtering operation on the B consecutive data blocks into which Z zeros have been inserted includes:

a spectrum filtering characteristic of the filtering operation being that a modulus value of a frequency domain filtering parameter in the middle of a transmission band spectrum is greater than a modulus value of a frequency domain filtering parameter beside the frequency domain filtering parameter in the middle of the transmission band spectrum.

In an implementation, the step of performing the filtering operation on the B consecutive data blocks into which Z zeros have been inserted includes:

filtering parameters of the filtering operation including [1,1].

In an implementation, the step of performing the filtering operation on the B consecutive data blocks into which Z zeros have been inserted includes:

if Z is equal to 0 (i.e., Z=0), filtering parameters of the filtering operation including f(p), the f(p) being:

f(p)=E·[1,1], where E is equal to 1 (i.e., E=1) or E is equal to $$\frac{\sqrt{2}}{2}\left(\text{i.e., } E = \frac{\sqrt{2}}{2}\right).$$

In an implementation, the step of performing the filtering operation on the B consecutive data blocks into which Z zeros have been inserted includes: if Z is equal to 1 (i.e., Z=1), filtering parameters of the filtering operation including f(p), the f(p) being:

$$f(p) = E \cdot \left[\cos\left(\frac{\pi}{4}\right), 1, \cos\left(\frac{\pi}{4}\right)\right] \otimes [1, 1],$$

where E is equal to 1 (i.e., E=1) or E is equal to $$\frac{1}{2\cos\left(\frac{\pi}{8}\right)}\left(\text{i.e., } E = \frac{1}{2\cos\left(\frac{\pi}{8}\right)}\right).$$

In an implementation, the filtering parameters of the filtering operation further include a root raised cosine (RRC) filtering parameter, and the filtering parameters of the filtering operation are:

f(p)⊗RRC, where the RRC is a root raised cosine function parameter.

In an implementation, the step of performing the filtering operation on the B consecutive data blocks into which Z zeros have been inserted includes:

filtering the B consecutive data blocks into which Z zeros have been inserted by using a time domain convolution method according to the filtering parameters.

In an implementation, the time domain convolution method is a cyclic convolution method.

All reference signal blocks and data blocks within the time slot have the same head-end reference signal sequence and the same tail-end reference signal sequence. All blocks have the same head-end reference signal sequence and the same tail-end reference signal sequence, and in this case, the out-of-band leakage is low. Moreover, filtering time slot data as a whole is equivalent to performing a cyclic convolution operation on each block.

In an implementation, the step of performing the filtering operation on the B consecutive data blocks into which Z zeros have been inserted includes:

transforming the B consecutive data blocks into which Z zeros have been inserted into frequency domain data from time domain data;

transforming the filtering parameters into frequency domain filtering parameters; and filtering the frequency domain data by using a frequency domain dot product method according to the frequency domain filtering parameters.

The step of filtering the data may be performing a filtering operation on the time domain data or performing a filtering operation on the corresponding frequency domain data after the time domain data are transformed into the corresponding frequency domain data.

In an implementation, the reference signal block and the data block have the same length.

In an implementation, in a case where the reference signal block and the data block are the OFDM symbols, the data modulation method further includes:

performing Fourier transform on the time domain data into which Z zeros have been inserted before performing the filtering operation on the time domain data into which Z zeros have been inserted; and performing inverse Fourier transform on the filtered frequency domain data after performing the filtering operation on the time domain data into which Z zeros have been inserted.

In a case where the data modulation method does not include the Fourier transform and the inverse Fourier transform operations, filtering may be performed by using a time domain convolution method. In a case where the reference signal block and the data block are the OFDM symbols, the data modulation method includes the Fourier transform and the inverse Fourier transform operations. In this case, filtering may be performed by using a frequency domain dot product method or a time domain convolution method.

In an implementation, the step of transmitting the filtered data on the physical resource includes:

performing other filtering operations on the filtered data.

In an implementation, FIG. 2 shows a case where the B consecutive data blocks are within one time slot structure. In FIG. 2, the one time slot includes N (N=1) reference signal block and M (M=14) data blocks. The reference signal block is the first block in FIG. 2, followed by fourteen consecutive data blocks. All reference signal block and data blocks within the one time slot have the same head-end reference signal sequence and the same tail-end reference signal sequence. In the embodiment, the reference signal block is at the head end of the one time slot, and the data blocks are at remaining positions of the one time slot. In other embodiments, the reference signal block and the data blocks may also be located in other positions of the one time slot. The reference signal block and the data blocks may also be a reference signal symbol and data symbols, that is, both the reference signal block and the data blocks are the OFDM symbols.

The reference signal sequences in the reference signal block are modulated by using the preset modulation mode. The head-end reference sequences and the tail-end reference sequences in the fourteen data blocks are also modulated by using the same preset modulation mode, and remaining portions in the fourteen data blocks transmit different data; and these data sequences are also modulated by using the preset modulation mode, for example, these data sequences are modulated by using the pi/2 BPSK modulation mode.

In an implementation, a time slot includes N (N=1) reference signal block and M (M=1) data block. The reference sequence in the reference signal block is modulated by using the pi/2 BPSK modulation mode. As shown in FIG. 3, the reference sequence in the reference signal block is s1=[1, j, 1, −j, −1, j, −1, −j, −1, −j, 1, −j, −1, j, 1, j]. The reference sequence and the data sequence in the data block are also modulated by using the pi/2 BPSK modulation mode. The data sequence in the data block is $d_1$=[−1, −j, −1, −j, 1, −j, −1, j, −1, j], and the data sequence $d_1$ may be obtained by performing a constellation modulation on a group of random binary bits $d_0$=[1, 1, 1, 1, 0, 1, 1, 0, 1, 0] through the pi/2 BPSK modulation mode. The head-end reference sequence in the data block is the same as the head-end reference sequence [1, j] in the reference signal block, and the tail-end reference sequence in the data block is the same as the tail-end reference sequence [−1, j, 1, j] in the reference signal block. A length of the reference signal block and a length of the data block are each sixteen. In other implementations, the length of the reference signal block and the length of the data block may be other lengths which are longer, and a length of the head-end reference sequence and a length of the tail-end reference sequence in the data block may also be other lengths.

The time domain data within one time slot are x(n)=[s1, 1, j, $d_1$, −1, j, 1, j]. After zero is inserted between adjacent time domain data (including the reference sequence and the data sequence) within the time slot, the time domain data are y(i). Then a filtering operation is performed, and the filtered data is transmitted on a time slot physical resource. In other embodiments, another filtering operation, such as a RRC filtering operation or a filtering operation in a digital to analog converter (DAC) module, may also be performed on the filtered data.

The filtering operation is a filtering operation performed by using the time domain convolution method, and the filtering parameters of the filtering operation are $$f(p) = E \cdot \left[\cos\left(\frac{\pi}{4}\right), 1, \cos\left(\frac{\pi}{4}\right)\right] \otimes [1, 1], \text{ and } E = \frac{1}{2\cos\left(\frac{\pi}{8}\right)}.$$

The filtered data are [a+bj, a+bj, b+aj, b+aj, a+bj, a−bj, b−aj, −b−aj, −a−bj, −a+bj, −b+aj, −b+aj, −a+bj, −a−bj, −b−aj, −b−aj, −a−bj, −a−bj, −a−bj, b−aj, a−bj, a−bj, b−aj, −b−aj, −a−bj, −a+bj, −b+aj, b+aj, a+bj, a+bj, b+aj, b+aj, a+bj, a+bj, b+aj, −b+aj, −a+bj, −a−bj, −b−aj, −b−aj, −a−bj, −a−bj, −b−aj, b−aj, a−bj, a−bj, b−aj, −b−aj, −a−bj, −a+bj, −b+aj, −b+aj, −a+bj, −a+bj, −b+aj, −a+bj, −b+aj, b+aj, a+bj, a+bj, b+aj, b+aj] (a=cos(pi/8), b=cos(3pi/8)).

Figure 4:
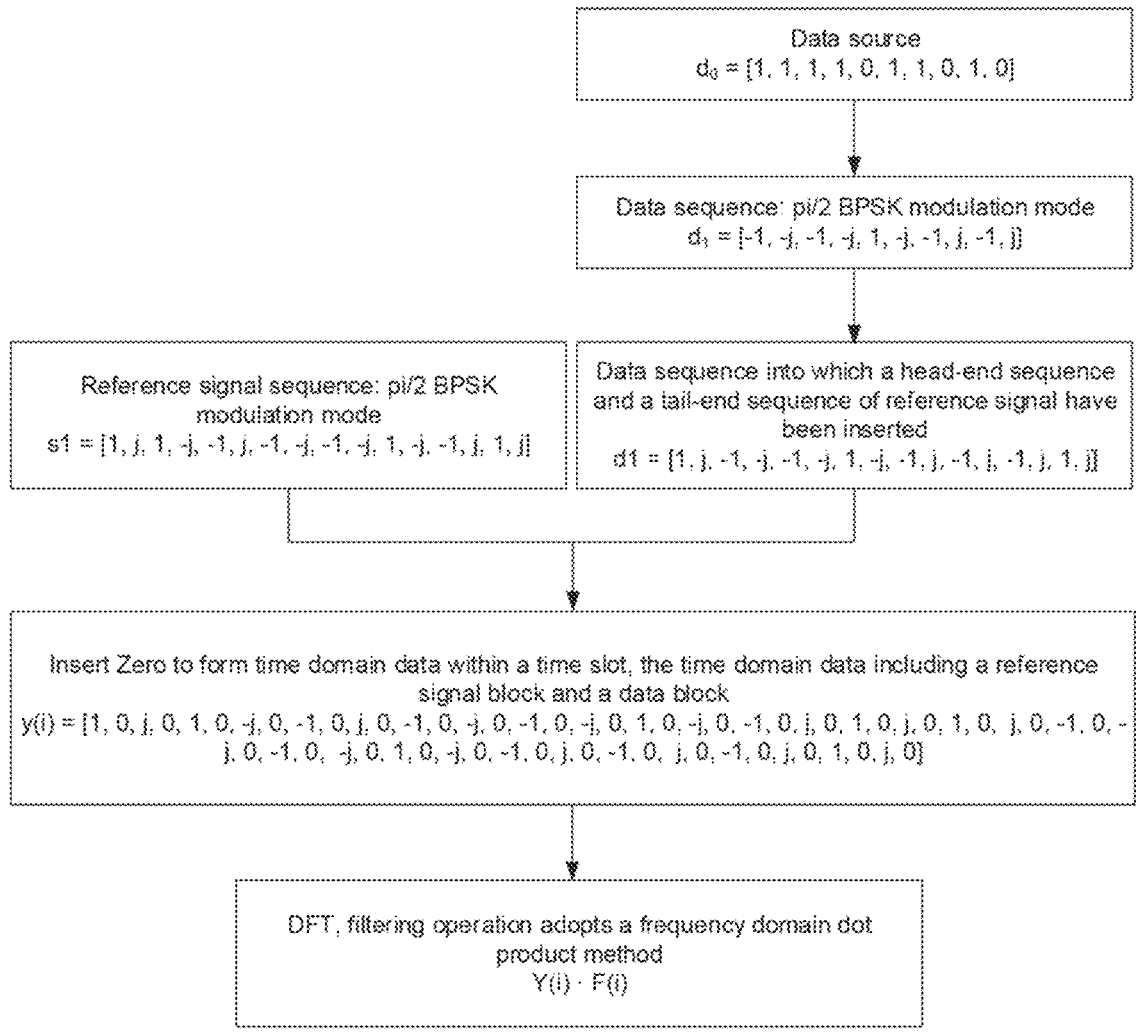
FIG. 4 is a flowchart of a data modulation method, in accordance with the embodiments of the present disclosure.

In an implementation, a time slot includes N (N=1) reference signal symbol and M (M=1) data symbol, and the symbols are the OFDM symbols. A reference sequence in the reference signal symbol is modulated by using the pi/2 BPSK modulation mode. As shown in FIG. 4, the reference sequence in the reference signal symbol is $s1 = [1, j, 1, −j, −1, j, −1, −j, −1, −j, 1, −j, −1, j, 1, j]$. A reference sequence and a data sequence in the data symbol are also modulated by using the pi/2 BPSK modulation mode. The data sequence in the data symbol is $d_1 = [−1, −j, −1, −j, 1, −j, −1, j, −1, jj]$, and the data sequence $d_1$ may be obtained by performing a constellation modulation on a group of random binary bits $d_0 = [1, 1, 1, 1, 0, 1, 1, 0, 1, 0]$ through the pi/2 BPSK modulation mode. A head-end reference sequence in the data symbol is the same as a head-end reference sequence [1, j] in the reference signal symbol, and a tail-end reference sequence in the data symbol is the same as a tail-end reference sequence [−1, j, 1, j] in the reference signal symbol.

The time domain data within the one time slot are $x(n) = [s1, 1, j, d_1, −1, j, 1, j]$; after zero is inserted between adjacent time domain data (including the reference sequence and the data sequence) within the time slot, the time domain data are y(i); and after transforming the time domain data y(i) into a frequency domain, the frequency domain data are Y(i), and then a filtering operation Y(i)·F(i) is performed. In other embodiments, the time domain data y(i) may also use the OFDM symbol as unit and be transformed into the frequency domain through discrete Fourier transform (DFT), and then the filtering operation is performed in the frequency domain.

The filtering operation is a frequency domain dot product filtering, and the filtering parameters of the filtering operation are f(p), and a frequency domain form thereof is F(i), where $$f(p) = E \cdot \left[\cos\left(\frac{\pi}{4}\right), 1, \cos\left(\frac{\pi}{4}\right)\right] \otimes [1, 1], \text{ and } E = \frac{1}{2\cos\left(\frac{\pi}{8}\right)}.$$

After the filtered frequency domain data are transformed into a time domain, the time domain data are [a+bj, a+bj, b+aj, b+aj, a+bj, a−bj, b−aj, −b−aj, −a−bj, −a+bj, −b+aj, −b+aj, −a+bj, −a−bj, −b−aj, −b−aj, −a−bj, b−aj, a−bj, a−bj, b−aj, −b−aj, −a−bj, −a+bj, −b+aj, b+aj, a+bj, a+bj, b+aj, b+aj, a+bj, a+bj, b+aj, −b+aj, −a+bj, −a−bj, −b−aj, −b−aj, −a−bj, −a−bj, −b−aj, b−aj, a−bj, a−bj, b−aj, −b−aj, −a−bj, −a+bj, −b+aj, b+aj, a+bj, a+bj, b+aj, b+aj, a+bj, a+bj, b+aj, b+aj, a+bj, a+bj, b+aj, −b+aj, −a+bj, −a+bj, −b+aj, b+aj, a+bj, a+bj, b+aj, b+aj] (a=(cos(pi/8), b=cos(3pi/8)).

Figure 5:
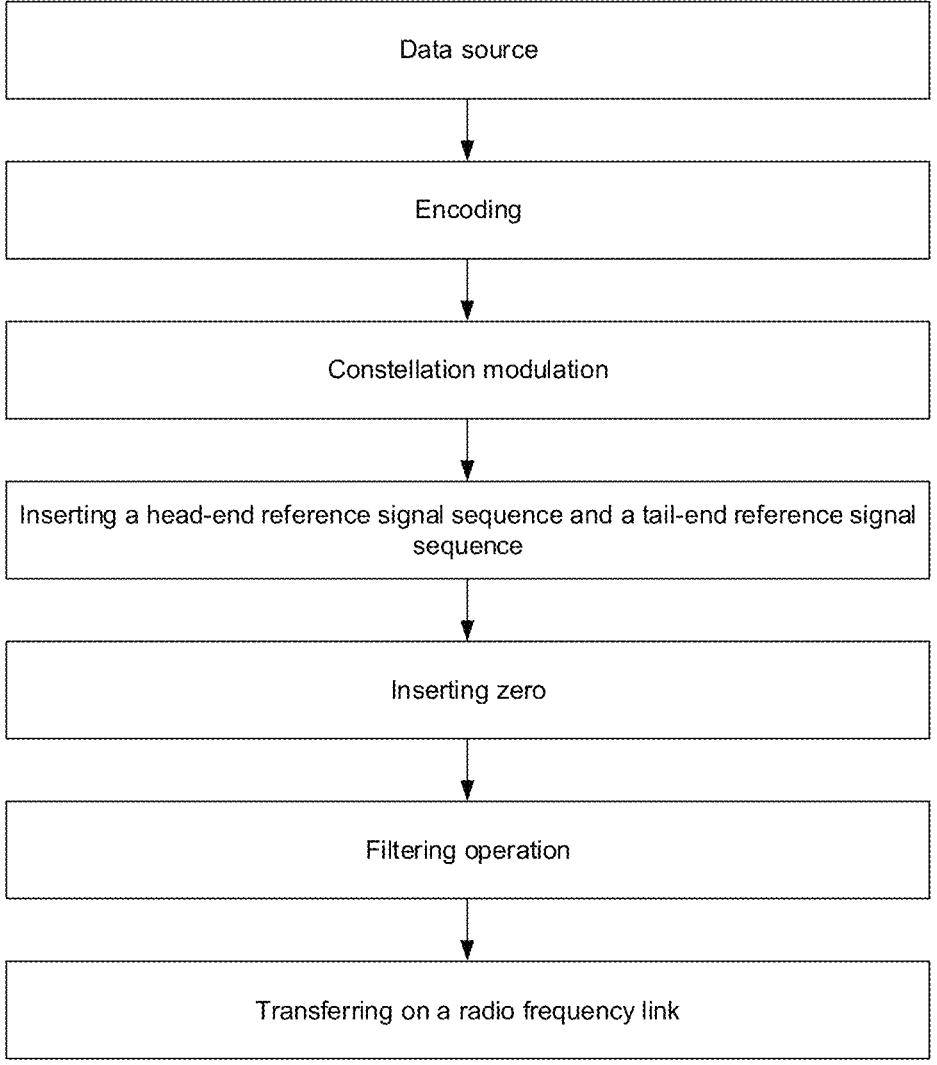
FIG. 5 is a flowchart of a data modulation method, in accordance with the embodiments of the present disclosure.

In an implementation, FIG. 5 shows a modulation process of a data modulation method at a sender. A group of binary bit data sequences is used as a data source, and the binary bit data sequences are encoded and are subjected to constellation modulation to generate data sequences. Then a head-end reference signal sequence and a tail-end reference signal sequence of a reference signal are inserted into the data sequences. Next, zero is inserted between the reference signal sequence and the data sequence. Finally, the filtering operation and a digital to analog conversion operation are performed to transmit the sequences on a radio frequency link.

Figure 6:
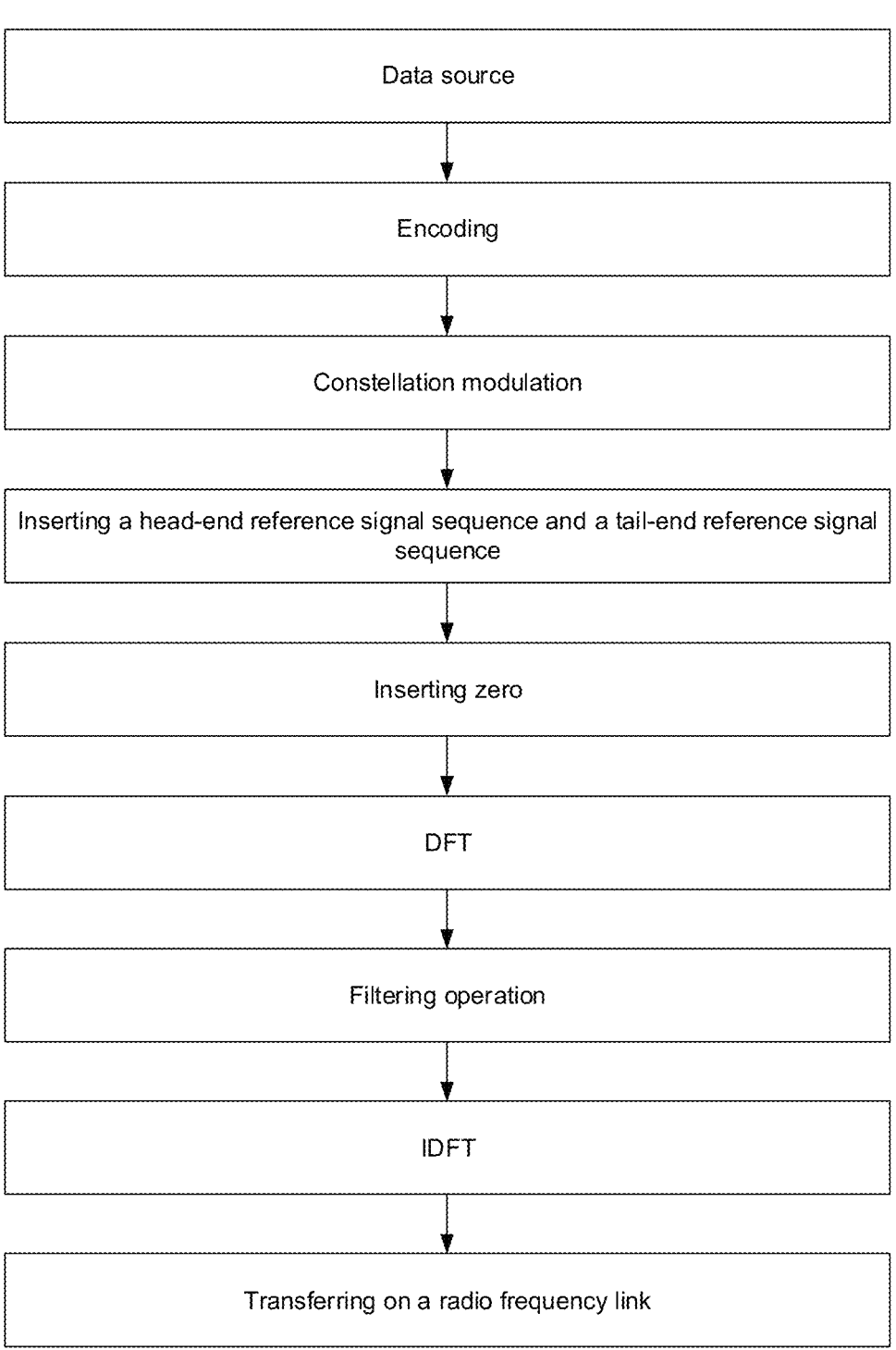
FIG. 6 is a flowchart of a data modulation method, in accordance with the embodiments of the present disclosure.

In an implementation, FIG. 6 shows a modulation process of a data modulation method at a sender. A group of binary bit data sequences is used as a data source, and the binary bit data sequences are encoded and are subjected to constellation modulation to generate data sequences. Then the head-end reference signal sequence and the tail-end reference signal sequence of the reference signal are inserted into the data sequences. Next, zero is inserted between the reference signal sequence and the data sequence. Finally, the DFT operation, the filtering operation, the inverse discrete Fourier transform (IDFT) operation and the digital to analog conversion operation (not shown in the figure) are performed to transmit the sequences on the radio frequency link.

The embodiment provides a communication device. The communication device includes a memory, a processor, a program stored in the memory and executable in the processor, and a data bus for achieving connection and communication between the processor and the memory. The program implements the data modulation method provided by the embodiments when executed by the processor.

The embodiment provides a storage medium for computer-readable storage. The storage medium has stored therein one or more programs. The one or more programs are executable by one or more processors to implement the data modulation method provided by the embodiments.

It will be understood by those skilled in the art that all or some of the steps in the method, the system, and the functional modules or units in the device disclosed above may be implemented as software, firmware, hardware, and suitable combinations thereof.

In a hardware implementation, the classification between functional modules or units described above does not necessarily correspond to the classification of physical components. For example, one physical component may have a plurality of functions, or one function or step may be performed by several physical components in cooperation. Some or all of the physical components may be implemented as software executed by a processor, such as a central processing unit, a digital signal processor or a microprocessor, or as hardware, or as an integrated circuit, such as an application specific integrated circuit. Such software may be distributed in a computer-readable medium, which may include a computer storage medium (or a non-transitory medium) and a communication medium (or a transitory medium). As well known to those skilled in the art, the term "computer storage medium" includes volatile and non-volatile, removable and non-removable media implemented in any method or technology for storing information (e.g., computer-readable instructions, data structures, program modules or other data). The computer storage medium includes, but is not limited to, a random access memory (RAM), a read-only memory (ROM), an electrically erasable programmable read-only memory (EE-PROM), a flash memory or other memory technologies, a portable compact disk read only memory (CD-ROM), a digital video disk (DVD) or other optical disk storage, magnetic cassettes, magnetic tapes, magnetic disk storage or other magnetic storage devices, or any other medium which may be used to store the desired information and may be accessed by a computer. In addition, it is well known to those skilled in the art that a communication medium typically includes computer-readable instructions, data structures, program modules or other data in a modulated data signal such as a carrier wave or other transmission mechanisms, and the communication medium may include any information delivery medium.

What is claimed is:

1. A data modulation method, comprising:

performing a preset modulation operation on B consecutive data blocks, and configuring the B consecutive data blocks to have at least one of a same head-end reference signal sequence or a same tail-end reference signal sequence;

performing a filtering operation on the B consecutive data blocks, and transmitting the filtered data on a physical resource, where B is greater than or equal to 2;

wherein filtering parameters of the filtering operation comprise f(p), the f(p) being:

f(p)=E·[1,1], wherein E is equal to 1 or E is equal to $$\frac{\sqrt{2}}{2};$$

wherein performing the preset modulation operation on the B consecutive data blocks, and configuring the B consecutive data blocks to have at least one of the same head-end reference signal sequence or the same tail-end reference signal sequence, comprises:

a reference signal sequence in a reference signal block within K consecutive time slots and a reference signal sequence and a data sequence in a data block within the K consecutive time slots being time domain data sequences modulated by using a preset modulation mode, where K is greater than or equal to 1, and the B consecutive data blocks being within the K consecutive time slots; and configuring all reference signal blocks and data blocks within the K consecutive time slots to have at least one of the same head-end reference signal sequence or the same tail-end reference signal sequence;

wherein the reference signal block and the data block have a same length.

2. The method according to claim 1, wherein performing the preset modulation operation on the B consecutive data blocks, comprises:

modulating bit data to be transmitted by using a preset modulation mode, the modulated data being transmitted in the B consecutive data blocks.

3. The method according to claim 1, wherein a time slot comprises N reference signal blocks and M data blocks, where N is greater than or equal to 0, and M is greater than or equal to 1.

4. The method according to claim 1, wherein the reference signal block and the data block are orthogonal frequency division multiplexing (OFDM) symbols.

5. The method according to claim 1, wherein adjacent time domain data of the B consecutive data blocks comprises a reference signal sequence and a data sequence.

6. The method according to claim 1, wherein the preset modulation mode comprises a pi/2 binary phase shift keying (BPSK) modulation mode or a quadrature phase shift keying (QPSK) modulation mode.

7. The method according to claim 1, wherein the filtering parameters of the filtering operation further comprise a root raised cosine (RRC) filtering parameter, and the filtering parameters of the filtering operation are:

f(p)⊗RRC, where the RRC is a root raised cosine function parameter.

8. The method according to claim 1, wherein performing the filtering operation on the B consecutive data blocks, comprises:

filtering the B consecutive data blocks by using a time domain convolution method according to the filtering parameters.

9. The method according to claim 8, wherein the time domain convolution method is a cyclic convolution method.

10. The method according to claim 1, wherein performing the filtering operation on the B consecutive data blocks, comprises:

transforming the B consecutive data blocks into frequency domain data from time domain data;

transforming the filtering parameters into frequency domain filtering parameters; and filtering the frequency domain data by using a frequency domain dot product method according to the frequency domain filtering parameters.

11. The method according to claim 4, wherein in a case where the reference signal block and the data block are the OFDM symbols, the method further comprises:

performing Fourier transform on the time domain data before performing the filtering operation on the B consecutive data blocks; and performing inverse Fourier transform on the filtered frequency domain data after performing the filtering operation on the B consecutive data blocks.

12. The method according to claim 1, wherein transmitting the filtered data on the physical resource, comprises:

performing an RRC filtering operation or a filtering operation in a digital to analog converter (DAC) module on the filtered data, wherein the RRC is a root raised cosine function parameter.

13. A communication device, comprising: a memory, a processor, a program stored in the memory and executable in the processor, and a data bus for achieving connection and communication between the processor and the memory, the program implementing the data modulation method according to claim 1 when executed by the processor.

14. A non-transitory computer-readable storage medium, wherein the storage medium has stored therein one or more programs that are executable by one or more processors to implement the data modulation method according to claim 1.

* * * * *